May 16, 1950     R. WARD     2,507,873
COMBINE GRAIN BIN UNLOADING ATTACHMENT
Filed Oct. 25, 1948     2 Sheets-Sheet 1

INVENTOR.
Reid Ward
BY
ATTORNEY.

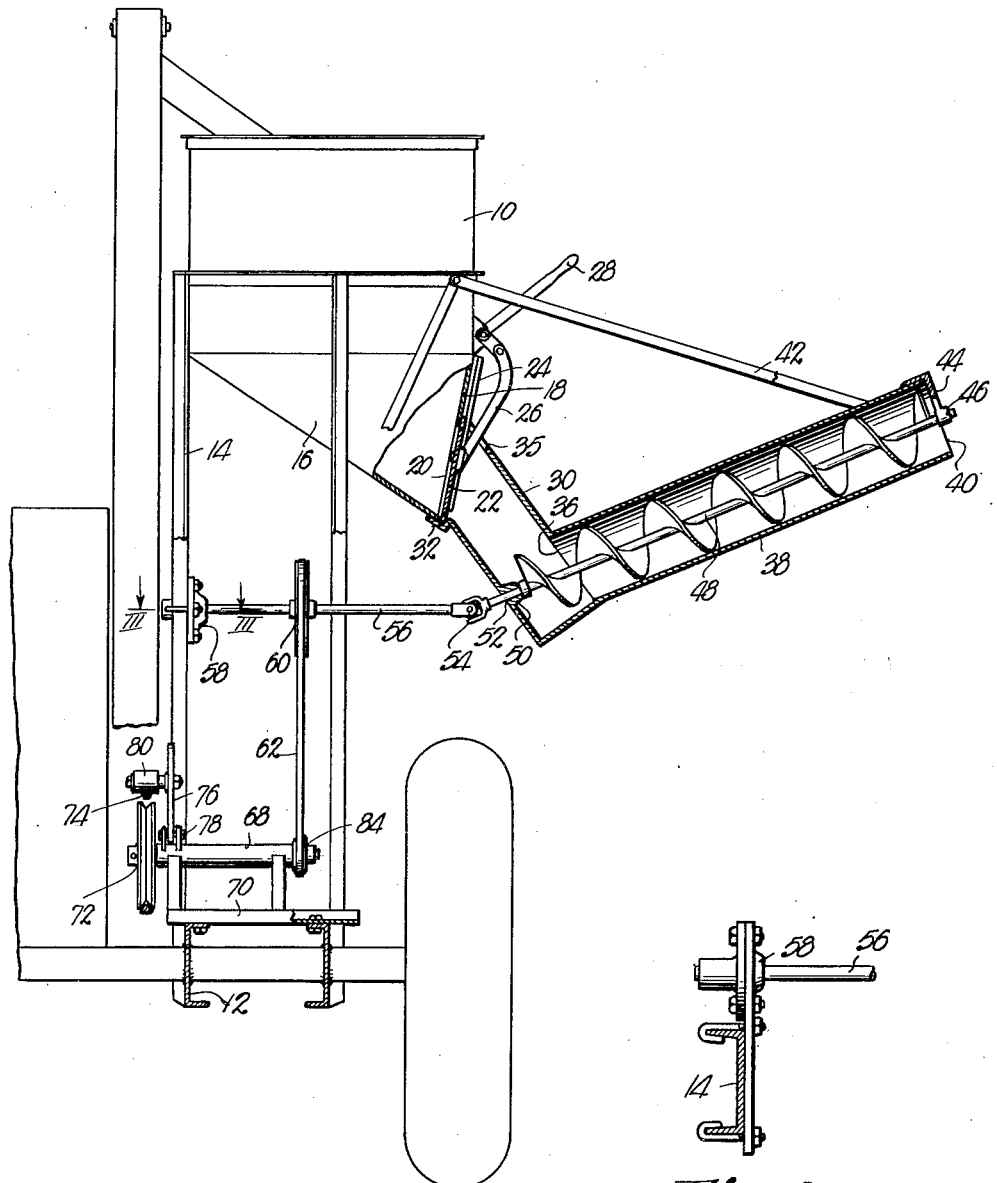

Patented May 16, 1950

2,507,873

UNITED STATES PATENT OFFICE 2,507,873

COMBINE GRAIN BIN UNLOADING ATTACHMENT

Reid Ward, Ottawa, Kans.

Application October 25, 1948, Serial No. 56,377

5 Claims. (Cl. 214—65)

This invention relates to the field of farm implements and more particularly to harvesting machines, particularly in the nature of combines, the primary object being to provide an automatic grain unloading assembly for the elevated bin of such combine operable to convey the grain within the bin to a point of discharge into a truck or the like at a point remote from the combine itself.

The most important object of this invention is the provision of an unloading attachment for grain bins of combines having an elongated tubular member extending laterally from the outlet opening of the bin and in communication therewith, said tubular member being provided with a rotatable auger for moving the grain from the bin to a point of discharge into a truck or the like.

Another important object of this invention is to provide an unloading attachment for grain bins having a specially formed drive mechanism for the auger thereof in the nature of a combination clutch and drive member, movable to and from a position for bringing an endless belt into frictional engagement with a pulley, the latter being operably connected to the auger.

Other objects of this invention include the way in which the auger assembly is connected to the grain bin for conveying the grain laterally therefrom; the manner in which a universal drive connection is provided for the auger; the manner in which a rotatable roller is mounted for swinging movement to and from a position engaging an endless belt; and the way in which said belt is brought into frictional engagement with a pulley having connection with the drive shaft, which, in turn, is operably connected to the driven shaft of the auger.

More minor objects will be made clear or become apparent as the following specification progresses, reference being had to the accompanying drawing, wherein:

Fig. 2 is a side elevational view of the unloading attachment showing the same operably mounted upon a combine grain bin, parts being broken away and in section to reveal details of construction; and Fig. 3 is a fragmentary detailed cross sectional view taken on line III—III of Fig. 2, looking in the direction of the arrows.

Figure 1:
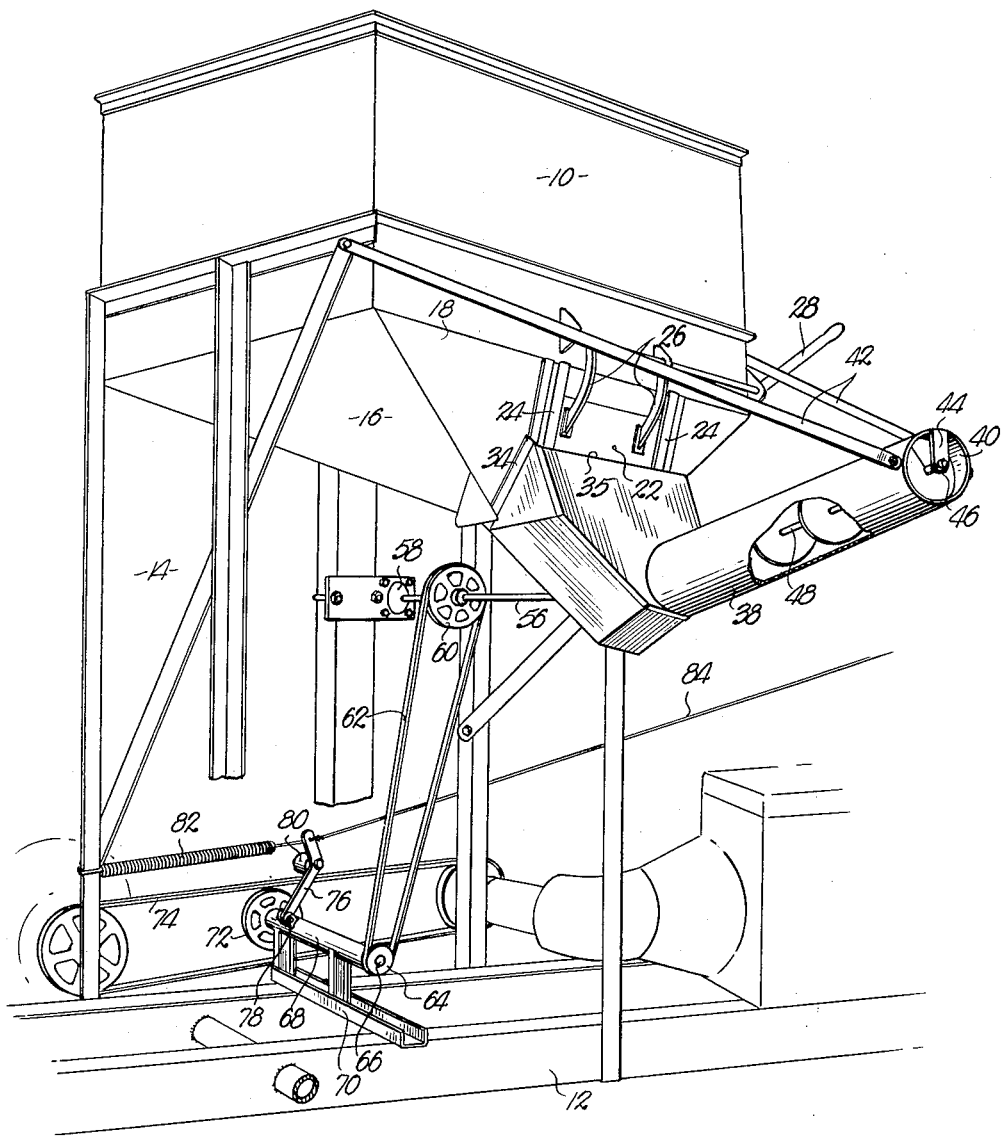
Fig. 1 is a perspective view of a portion of combine showing a grain bin unloading attachment made in accordance with the present invention, parts being broken away to reveal details of construction.

Present day combines having elevated grain receiving bins provided with an outlet opening near the bottom thereof present a difficult problem in the operation of dumping the contents of the grain bin into a truck or the like. The grain bins are provided with a manually operable trap door for the outlet opening and the grain must flow to the truck disposed along side the combine by the action of gravity. It is oftentimes difficult to position the truck close enough to the combine to receive such a flow of grain and it is impossible to meet the problem by simply extending the bin by way of an elongated chute extending laterally and downwardly from the bin itself. If the chute does not have the proper inclination, the grain will not flow readily and furthermore, if the proper inclination is given to the outlet chute, then the lowermost end of the latter will not clear the top of the truck bed.

These difficulties are all met by the structure about to be described and, in the drawing, the numeral 10 designates broadly an elevated grain bin of conventional character utilized by many types of combines.

It is to be understood at the outset that the particular make of combine and the precise construction and disposition of the grain bin itself, forms no part of this invention and that the attachment hereof may well be applied through minor alterations to structures differing from that chosen for illustration in the drawings.

The open top grain bin 10 is supported upon the combine framework 12, through the use of a plurality of upright frame members broadly designated by the numeral 14. After the grain is harvested, it is elevated, by structure not herein illustrated, to the bin 10. The bottom 16 of the bin 10 is formed by a plurality of inclined walls that converge toward a common point at the bottom of the bin 10 and adjacent one side wall thereof. One of these inclined walls 18 is provided with an outlet opening 20 that is closed by a vertically slidable door or gate 22, mounted within opposed guides 24. Laterally extending arcuate arms 26 on the gate 22 serve to shift the latter to and from a position closing the opening 20 upon manipulation of a lever 28. Here again, and by way of repetition, it is to be understood that the precise construction of the bottom 16 of bin 10 and of the gate assembly, is of no importance concerning the adaptability of the unloading assembly thereto.

To facilitate the unloading operation, there is provided a hollow housing 30 that extends at an angle downwardly and outwardly from the outlet opening 20 and communicates with the latter at one end of housing 30. This housing 30 is provided with overlapping flanges 32 and 34 that are welded directly to the bottom 16 or otherwise affixed thereto in partial enclosing relationship to the gate 22.

The uppermost edge 34 of the housing 30 is in spaced relationship to the gate 22 to permit free movement of the arms 26 when lever 28 is manipulated as is clear in Fig. 2 of the drawing. That end of the housing 30 opposite to the grain bin 10, has an outlet opening 36 provided in its uppermost wall for receiving one end of an elongated tube 38 that projects at an angle outwardly and upwardly from the housing 30. The outermost free end 40 of the tube 38 is open and disposed on a horizontal plane passing substantially through the gate 22.

Since, as hereinafter will be made clear, means is provided to elevate the grain along the tube 38, it is possible to dispose the end 40 at a height where the truck body will clear the same which would not be possible if reliance was had entirely upon gravity dumping.

The tube 38 is supported by a pair of braces 42 extending from the bin 10 and converging to a point of connection with the tube 38 adjacent the outermost end 40 thereof.

A bracket 44 secured to tube 38 and overlapping the open end 40 thereof is provided with a bearing 46 for rotatably receiving one end of an auger 48. The opposite end of auger 48, which is disposed within the tube 38, is rotatably mounted within a bearing 50 mounted in the housing 30. An opening 52 in housing 30 clears this proximal end of the auger 48.

A suitable universal joint 54 interconnects the auger 48 with a substantially horizontal shaft 56 that is rotatably mounted within a bearing 58 secured to one of the frame members 14.

A sheave 60 secured to the shaft 56 intermediate the ends thereof receives an endless belt or the like 62 that in turn passes over a smaller sheave 64 upon a second shaft 66. The shaft 66 is substantialy parallel to the shaft 56 and is rotatably mounted within a sleeve 68 that is in turn secured to the combine framework 12 by means of a support 70. That end of the shaft 66 opposite to the sheave 64 is provided with a pulley 72 that is disposed between the stretches of an endless belt 74, forming a part of the combine itself. When the combine is placed in operation, this belt 74 is in continuous motion and by bringing belt 74 into contact with the pulley 72, the auger 48 is rotated. Means for so moving one stretch of the belt 74, and in the instance shown, the uppermost stretch thereof constitutes a substantially L-shaped arm 76 pivotally mounted at one end thereof upon the sleeve 68 as at 78. This arm 76 is provided with a roller 80 in overlying relationship to the uppermost stretch of belt 74. Arm 76 is held biased toward one end of its path of travel with the roller 80 thereof out of engagement with the belt 74 by a spring 82 that interconnects the same with one of the legs of the framework 14.

A cable 84 having one end thereof connected to the arm 76 and extending in a direction opposite to the spring 82, terminates at any convenient point accessible to an operator.

In operation, when it is desired to move the contents of bin 10 to a truck or the like disposed beneath the outermost end 40 of tube 38, the lever 24 is first actuated to release gate 22 and permit the grain to flow by force of gravity into housing 30. The operator thereupon exerts a pull upon cable 84 to swing arm 76 against the action of spring 82. Such springing movement of arm 76 brings roller 80 into rotative engagement with the moving belt 74, and continued pulling of cable 84 will cause the uppermost stretch of belt 74 to move into engagement with the pulley 72. Frictional engagement between belt 74 and pulley 72 will cause rotation of the latter and consequent rotation of shaft 76, sheave 64, sheave 60 on through belt 62, shaft 56 and auger 48. As the auger 48 rotates within the tube 38, the grain within housing 30 will be moved longitudinally along tube 38 and upwardly to a discharge position at open end 40 of tube 38 where such grain will fall by gravity to the underlying truck.

Having thus described the invention, what is claimed as new and desired to be secured by Letters Patent is:

1. In a harvesting implement having an elevated grain bin provided with an outlet opening formed in the bottom thereof, said implement also having an endless drive belt forming a part thereof disposed below said bin; the improvement of which comprises an open end tube mounted on the bin and extending laterally therefrom; an auger in the tube; a hollow housing interconnecting one end of the tube with said bin opening; and means operably connectable with said belt and joined to said auger for driving the latter, said housing being inclined downwardly from said bin whereby to feed grain by gravity from the bin to said tube.

2. In a harvesting implement having an elevated grain bin provided with an outlet opening forming in the bottom thereof, said implement also having an endless drive belt forming a part thereof disposed below said bin; the improvement of which comprises an open end tube mounted on the bin and extending laterally therefrom; an auger in the tube; a hollow housing interconnecting one end of the tube with said bin opening; and means operably connectable with said belt and joined to said auger for driving the latter, said means including a rotatable pulley disposed in alignment with one stretch of the belt, and manually operable structure for moving said stretch of the belt into frictional engagement with said pulley.

3. In a harvesting implement having an elevated grain bin provided with an outlet opening formed in the bottom thereof, said implement also having an endless drive belt forming a part thereof disposed below said bin; the improvement of which comprises an open end tube mounted on the bin and extending laterally therefrom; an auger in the tube; a hollow housing interconnecting one end of the tube with said bin opening; and means operably connectable with said belt and joined to said auger for driving the latter, said means including a rotatable pulley disposed in alignment with one stretch of the belt, and manually operable structure for moving said stretch of the belt into frictional engagement with said pulley, said structure including a roller on one side of the belt opposite to the pulley and a swingable support for the roller for moving the roller against the belt.

4. In a harvesting implement having an elevated grain bin provided with an outlet opening formed in the bottom thereof, said implement also having an endless drive belt forming a part thereof disposed below said bin; the improvement of which comprises an open end tube mounted on the bin and extending laterally therefrom; an auger in the tube; a hollow housing interconnecting one end of the tube with said bin opening; and means operably connectable with said belt and joined to said auger for driving the latter, said means incuding a pair of spaced, substantially parallel shafts each having a sheave thereon, one of the shafts being connected to said auger, a belt interconnecting the sheaves, and structure on the other shaft and engageable by the belt for rotating said other shaft.

5. In a harvesting implement having an elevated grain bin provided with an outlet opening formed in the bottom thereof, said implement also having an endless drive belt forming a part thereof disposed below said bin; the improvement of which comprises an open end tube mounted on the bin and extending laterally therefrom; an auger in the tube; a hollow housing interconnecting one end of the tube with said bin opening; and means operably connectable with said belt and joined to said auger for driving the latter, said means including a pair of spaced, substantially parallel shafts each having a sheave thereon, one of the shafts being connected to said auger, a belt interconnecting the sheaves, and structure on the other shaft and engageable by the belt for rotating said other shaft, said structure including a pulley adjacent one stretch of the belt, there being a swingable arm near the belt having a roller thereon engageable with the belt for moving the latter against the pulley when the arm is swung in one direction.

REID WARD.

REFERENCES CITED

The following references are of record in the file of this patent:

UNITED STATES PATENTS

| Number | Name | Date |
|---|---|---|
| 1,615,334 | MacGregor | Jan. 25, 1927 |
| 1,751,601 | Raney et al. | Mar. 25, 1930 |
| 1,869,581 | Paradise et al. | Aug. 2, 1932 |
| 2,022,166 | Welty | Nov. 26, 1935 |
| 2,319,588 | Dreese | May 18, 1943 |
| 2,332,029 | Thor | Oct. 19, 1943 |